United States Patent [19]

Quintens et al.

[11] Patent Number: 5,372,924
[45] Date of Patent: Dec. 13, 1994

[54] ANTISTATIC PLASTIC MOLDINGS

[75] Inventors: Dirk Quintens, Lier, Belgium; Wolfgang Fischer, Meerbusch, Germany; Friedrich Jonas, Aachen, Germany; Holger Ohst, Odenthal-Steinhaus, Germany; Hans Rehbein, deceased, late of Krefeld, Germany, by Gisela D. Rehbein née Schmitz, Dirk Rehbein, coheirs

[73] Assignee: Agfa Gevaert Aktiengesellschaft, Leverkusen, Germany

[21] Appl. No.: 243,068

[22] Filed: May 16, 1994

Related U.S. Application Data

[63] Continuation of Ser. No. 58,219, May 10, 1993, abandoned.

[30] Foreign Application Priority Data

May 21, 1992 [DE] Germany ............................ 4216762

[51] Int. Cl.$^5$ ................................................. G03C 1/85
[52] U.S. Cl. .................................... 430/527; 430/271; 430/530
[58] Field of Search ............... 430/527, 530, 270, 271, 430/281

[56] References Cited

U.S. PATENT DOCUMENTS

| | | |
|---|---|---|
| 4,571,361 | 2/1986 | Kawaguchi et al. |
| 4,916,011 | 4/1990 | Miller .................... 430/527 |
| 5,006,451 | 4/1991 | Anderson et al. .................. 430/530 |

FOREIGN PATENT DOCUMENTS

| | | |
|---|---|---|
| 0188264 | 7/1986 | European Pat. Off. |
| 9102289 | 2/1991 | European Pat. Off. |
| 0421345 | 4/1991 | European Pat. Off. |
| 0440957 | 8/1991 | European Pat. Off. |

OTHER PUBLICATIONS

European Search Report, No. 93107556.8, Sep. 20, 1993.
Research Disclosure, Feb. 1992, No. 334, pp. 155–159.

Primary Examiner—Jack P. Brammer
Attorney, Agent, or Firm—Connolly and Hutz

[57] ABSTRACT

Antistatically treated plastic moldings which contain two layers on the surface to be antistatically treated, the layer situated nearer the plastic surface being an antistatic layer and the more remote layer being a protective layer of a radiation-curing coating composition which is cured by exposure to ionizing radiation, are distinguished by excellent antistatic properties and very good surface properties.

7 Claims, No Drawings

ANTISTATIC PLASTIC MOLDINGS

This application is a continuation of Ser. No. 08/058,219, filed May 10, 1993, now abandoned.

This invention relates to a firmly adhering antistatic coating for plastic moldings based on polythiophene or vanadium pentoxide preparations.

It is known that preparations of polythiophenes containing polyanions can be used for the antistatic treatment of plastic moldings, particularly supports for photographic materials (EP 440 957). It is also known that vanadium pentoxide preparations can be used for the antistatic treatment of plastic moldings (DE 26 31 628). It has now been found that, despite its excellent antistatic effect, the antistatic coating has disadvantages in its strength of adhesion, in its adhesion behavior on gelatine surfaces and in its scratch resistance.

The problem addressed by the present invention was to obviate this disadvantage without impairing the antistatic effect.

More particularly, the problem addressed by the invention was to provide a hydrophobic plastic support, for example a polyethylene terephthalate film or a paper coated with polyethylene on both sides, which has at least one antistatic coating first layer with a protective second layer which does not impair the antistatic properties.

More particularly, the problem addressed by the present invention was to provide a hydrophobic plastic support, which is coated with at least one gelatine silver halide emulsion layer and which has an antistatic layer on its reverse side, with a water-impermeable layer which would protect the antistatic layer without impairing its antistatic properties.

According to the invention, the solution to this problem is characterized in that a radiation-curing coating composition is applied to the antistatic layer applied to the hydrophobic support and is cured by exposure to ionizing radiation, for example to UV radiation or an electron beam.

In the context of the invention, an antistatic layer is understood to be a layer which provides the material with a mobility of the electrical charges, determined as the discharge time in-msec., of less than 10 msec. and, more particularly, less than 1 msec. at 21° C./30% relative humidity.

The antistatic layer preferably contains a preparation of a vanadium pentoxide sol or, in a particularly preferred embodiment, a preparation of a polythiophene which is made up of structural units corresponding to the following formula

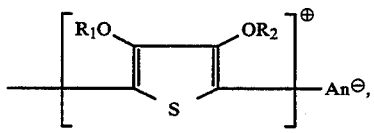

in which $R_1$ and $R_2$ independently of one another represent hydrogen or a $C_{1-4}$ alkyl group or, together, form an optionally substituted $C_{1-4}$ alkylene radical, preferably an optionally alkyl-substituted methylene radical, an optionally $C_{1-12}$ alkyl- or phenyl-substituted 1,2-ethylene radical, a 1,3-propylene radical or a 1,2-cyclohexylene radical and $An^\ominus$ is a polyanion.

$R_1$ and $R_2$ are preferably methyl and ethyl groups.

Representatives of the optionally substituted $C_{1-4}$ alkylene radicals, which $R_1$ and $R_2$ may form together, are preferably the 1,2-alkylene radicals derived from 1,2-dibromoalkanes of the type obtainable in the bromination of α-olefins, such as ethene, prop-1-ene, hex-1-ene, oct-1-ene, dec-1-ene, dodec-1-ene and styrene; the 1,2-cyclohexylene, 2,3-butylene, 2,3-dimethyl-2,3-butylene and 2,3-pentylene radicals are also mentioned.

Preferred radicals for $R_1$ and $R_2$ together are the methylene, 1,2-ethylene and 1,3-propylene radical, the 1,2-ethylene radical being particularly preferred.

The polyanions are anions of polymeric carboxylic acids, such as polyacrylic acids, polymethacrylic acids, polymaleic acids, and polymeric sulfonic acids, such as polystyrene sulfonic acids and polyvinyl sulfonic acids. These polycarboxylic and sulfonic acids may also be copolymers of vinyl carboxylic and vinyl sulfonic acids with other polymerizable monomers, such as acrylates and styrene.

The molecular weight $\overline{M}_n$ of the polyacids yielding the polyanions is preferably in the range from 1000 to 2,000,000 and, more preferably, in the range from 2000 to 500,000. The polyacids or their alkali metal salts are commercially available, for example polystyrene sulfonic acids and polyacrylic acids, or may be produced by known methods (see, for example, Houben-Weyl, Methoden der organischen Chemie, Vol. E 20, Makromolekulare Stoffe, Part 2, (1987), pages 1141 et seq.).

Mixtures of alkali metal salts of the polyacids and corresponding quantities of monoacids may also be used instead of the free polyacids required for the formation of the preparations according to the invention of polythiophenes and polyanions.

The preparations may also be true solutions, colloidal solutions or fine-particle dispersions.

The production of these preparations is described in EP-A-0 440 957.

Besides water, other protic solvents may be used as the solvent or dispersion medium of the polythiophene preparations, including for example lower alcohols, such as methanol, ethanol and isopropanol, and mixtures of water with lower alcohols and other water-miscible organic solvents, such as acetone.

The polythiophene preparations may contain low molecular weight wetting agents or dispersants, for example anionic surfactants, such as sodium dodecyl sulfate, cationic surfactants, such as cetyl trimethyl ammonium bromide, and nonionic-surfactants, such as alkylphenol/polyethylene oxide adducts which are added before, during or after the polymerization. The incorporation of nonionic surfactants before polymerization is preferred.

The term "dispersion" includes a macro-dispersion wherein the average particle size is larger than 100 nm as well as a "colloidal" dispersion wherein the particles have an average particle size ranging from polymer molecule size to the average particle size of polymer molecule conglomerates having an average particle size not larger than 100 nm.

For the antistatic treatment of the plastic moldings, the polythiophene preparations may be applied to the moldings by known methods, for example by impregnation, casting, spraying, gravure printing, knife coating, spread coating, etc. After removal of the solvent, for example water, the antistatic layer unaffected by atmospheric moisture which is formed by the polythiophene on the treated molding is directly present on the molding.

To obtain coatings of greater adhesion and scratch resistance, polymeric binders soluble or suspendable in water, for example polyvinyl alcohol or polyvinyl acetate dispersions, may also be added to the polythiophene salt preparations.

In the case of acid-sensitive plastic moldings and to protect the equipment used for application, it can be of advantage to neutralize excess free acid groups in the polythiophene salt preparations before they are applied to the plastic moldings by addition of alkali metal or alkaline earth metal hydroxides, ammonia or amines.

After drying, the thickness of the layers in which the polythiophene dispersions are applied to the plastic moldings to be antistatically treated is in the range from 0.001 to 100 $\mu$m and preferably in the range from 0.002 to 10 $\mu$m, depending on the desired conductivity of the molding and the desired transparency of the coating.

Removal of the solvents after application of the solutions may be carried out simply by evaporation at room temperature. However, to obtain higher processing speeds, it is of greater advantage to remove the solvents at elevated temperatures, for example at temperatures of up to 150° C. and preferably at temperatures in the range from 60° to 130° C.

The production of the polythiophene dispersions or solutions in accordance with EP-OS 440 957 leads to products in which the content of polymerized thiophene makes up from 5 to 50% by weight, based on the total solids. In the production of the polythiophene dispersions, up to 90% by weight, based on the total solids, of other polymer latices or dispersions containing acidic groups (salts), such as $-SO_3^-$, $-COO^-$ phenolate or $-PO_3^{2-}$, may also be added. The content of acidic groups is preferably above 2% by weight to ensure adequate stability of the dispersion or solution.

Polymers suitable for this purpose are described, for example, in DE-A 25 41 230, DE-A 25 41 274, DE-A 28 35 856, EP-A-0 014 921, EP-A-0 069 671, EP-A-0 130 115, U.S. Pat. No. 4,291,113.

The polymer dispersions or latices may contain linear, branched or crosslinked polymers. The crosslinked polymers with a high content of acidic groups are swellable in water and may be used in the form of so-called microgels. Microgels such as these are described, for example, in U.S. Pat. Nos. 4,301,240, 4,677,050 and 4,147,550.

The applied quantity of polymerized thiophene in the dispersion or solution used is preferably from 0.001 to 0.3 g/m² and, more preferably, from 0.003 to 0.2 g/m².

The vanadium pentoxide sols used for the antistatic coating may be prepared by melting vanadium pentoxide and pouring the melt into water. The vanadium pentoxide sols obtained in this way may be directly used for coating plastics.

The vanadium pentoxide sols are preferably prepared by reaction of alkali metal, alkaline earth metal or ammonium vanadates with strongly acidic ion exchangers, preferably with ion exchangers containing SO₃H groups. The vanadium pentoxide sols are prepared, for example, by stirring the ion exchanger with ammonium vanadate in aqueous solution. The vanadium pentoxide sol formed is filtered off from the ion exchanger and is directly ready for use. The ion exchanger is used in such a quantity that the number of acid groups present is sufficient to bind the total quantity of ammonium or alkali metal or alkaline earth metal ions.

An excess of acid groups is preferably used. The vanadate is used in such a quantity that the vanadium pentoxide sol formed preferably contains less than 5% by weight and, more preferably, from 0.005 to 1% by weight vanadium pentoxide solid. To achieve a more uniform coating of the films, surfactants may be added to the vanadium pentoxide sols. Examples of suitable surfactants are alkali metal alkyl sulfonates or sulfates, fluorinated alkyl sulfonic acid salts, for example sodium perfluorooctyl sulfonate.

After drying, the thickness of the layer, in which $V_2O_5$ is applied to the plastic moldings to be antistatically treated, is between 0.001 and 1 $\mu$m and preferably between 0.003 and 0.1 $\mu$m, depending on the desired conductivity of the molding.

Substantially colorless coatings of high surface resistance are obtained if the vanadium pentoxide sol is aged before processing. The freshly prepared vanadium pentoxide sols are preferably used for coating only after ageing at room temperature for 1 week and, more preferably, for 2 to 20 weeks. In addition, it has been found to be useful to dilute the vanadium pentoxide sols with water before processing. The plastic moldings, particularly films, to be antistatically treated are coated by known methods, for example by dip coating, knife coating, spray coating, printing, for example intaglio printing, or casting.

Substrates which may be antistatically or electrically conductively treated by the process according to the invention are, above all, moldings of organic polymers, more particularly films of polycarbonates, polyamides, polyethylenes, polypropylenes, polyvinyl chloride, polyesters, cellulose acetate and cellulose. However, inorganic materials, for example glass, or ceramic materials of aluminium oxide and/or silicon dioxide may also be antistatically treated by the process according to the invention.

Suitable hydrophobic plastic supports for photographic silver halide materials are known from the literature and consist, for example, of polyester, cellulose triacetate, polyvinyl chloride or polycarbonate. Polyethylene terephthalate is preferred. A paper coated with poly-$\alpha$-olefin, more particularly paper coated with polyethylene, is also suitable.

Before coating with the antistatic layer, the hydrophobic plastic support is optionally provided with one or more substrate layers to improve the adhesion of hydrophilic colloid layers subsequently applied. Suitable substrate layers for polyethylene terephthalate supports are known, for example, from U.S. Pat. Nos. 3,397,988, 3,649,336, 4,123,278, 4,478,907, GB 1,234,755 and Research Disclosure, July 1967, page 6. Particularly suitable substrate layers consist of vinylidene polymers with copolymerized, ethylenically unsaturated hydrophilic monomers, preferably itaconic acid units (U.S. Pat. No. 3,649,336).

In one embodiment of the invention, the antistatic layer is situated on the same side of the support as the photographic layers and is separated from them by the radiation-cured coating composition.

In another embodiment of the invention, the antistatic layer is situated on that side of the support which is remote from the photographic layers. Accordingly, the radiation-cured coating composition becomes the outermost protective layer on the back of the photographic material and also serves as an anti-abrasion layer.

In one preferred embodiment of the invention, a so-called NC layer (anti-curling layer), which counteracts the tendency of the wet-processed material to curl up, is present over the antistatic and protective layers applied to the back of the photographic material. The NC layer contains a hydrophilic colloid, for example gelatine, and may be at least partly hardened to reduce water absorption and abrasion. Suitable hardeners are described in The Theory of the Photographic Process, edited by T. H. James, 4th Edition, pages 77 to 87.

In addition, the layer combination of the antistatic layer and protective layer applied to the back of the support in relation to the silver halide emulsion layers may be covered by an antihalo layer containing one or more dyes or pigments in a hydrophilic colloid, for example in gelatine. The dyes and pigments and may be capable of decoloration or may be stable in the processing solutions.

The silver halide materials according to the invention may be used for half-tone photography, screen photography, microphotography and radiography. They are suitable for black-and-white materials and color materials and for silver complex diffusion transfer reversal (DTR) and dye diffusion transfer processes.

The composition of the silver halide emulsion layers is described, for example, in Research Disclosure 17 643 (December 1978) and Research Disclosure 307 105 (November 1989).

Problems caused by static charging can be avoided or considerably reduced by the combination of antistatic and surface layers according to the invention. This applies not only to photographic materials, but also to materials for diazotype processes, to vesicular materials, to magnetic, electrographic or electrophotographic recording materials.

The following Examples relates to the use of the layer combination of antistatic and surface layers on polyethylene terephthalate supports comprising a substrate layer. However, the layer combination may also be used on supports of polystyrene, polyvinyl chloride or polyethylene, all the supports optionally being exposed beforehand to a corona discharge to improve the adhesion of the hydrophilic colloid layers.

By virtue of their transparency, the coatings obtainable in accordance with the invention are particularly suitable for the antistatic treatment of photographic materials, more particularly films, for example black-and-white, color negative and reversal films, preferably in the form of a backing layer, i.e. in a layer which is applied to that side of the hydrophobic layer support which is remote from the silver halide emulsion layers.

Suitable radiation-curing coating compositions are, for example, (meth)acryloyl-functional prepolymers containing at least two (meth)acryloyl groups and preferably two to four (meth)acryloyl groups per molecule which are derived from polyesters, polyethers, polyepoxide compounds, aliphatic polyols, polyurethanes and vinyl polymers. (Meth)acrylate prepolymers such as these are known and are described, for example, in U.S. Pat. Nos. 2,101,107; 2,413,973; 2,951,758; 3,066,112; 3,301,743; 3,368,900; 3,380,831; 3,455,801; 3,469,982; 3,485,732; 3,530,100; 3,551,246; 3,552,986; 3,628,963; 3,660,145; 3,664,861; 3,689,610; 3,719,521; 3,732,107; 3,782,961; 3,840,369; 3,888,830; 4,033,920; 4,081,492; 4,206,025; GB-PS 1,006,587; 1,241,823; 1,241,824; 1,321,372; DE-OS 1 916 499; 2 429 527; 2 34 012; 2 737 406 and 2 853 921.

Preferred (meth)acrylate prepolymers are polyester (meth)acrylates which may be obtained by azeotropic esterification of dicarboxylic acids with difunctional or higher polyols and (meth)acrylic acid. Typical dicarboxylic acids are, for example, phthalic acid and adipic acid. Polyols are, for example, glycol and polyethylene glycol, trimethylol propane, glycerol and pentaerythritol, reaction products of polyepoxides, for example bisphenol A bisglycidyl ether with (meth)acrylic acid and polyurethane (meth)acrylates which are obtained by addition of hydroxyalkyl (meth)acrylate onto aromatic or aliphatic polyisocyanates and, optionally, further addition onto polyols.

In addition, amine-modified polyether acrylates obtainable from aliphatic primary amines and (meth)acrylates of ethoxylated or propoxylated polyols in accordance with DE-OS 3 706 355 may be used as the (meth)acryloyl-functional prepolymers as surface lacquer binders.

Cationically curing lacquer systems activatable by UV radiation, for example based on epoxides or vinyl ethers, may also be used for the production of thin surface layers with a thickness below 4 $\mu$m, because systems such as these do not have to be cured in an inert gas atmosphere, even in small layer thicknesses.

Suitable systems are described, for example, in J. V. Crivello, J. L. Lee and D. A. Coulon, New Monomers for Cationic UV Curing, Radiation Curing VI, Conference Proceedings (Sep. 20 to 23, 1982), Chicago, Ill., and are marketed by Union Carbide, for example under the name Cyracure ®.

The surface lacquer binders according to the invention contain reactive radiation-curing diluents or mixtures of such diluents as typical auxiliaries. In addition to their function as a diluent for the prepolymers, these products may also be used to vary the mechanical properties, for example the hardness, of the resulting films. Reactive radiation-curing diluents of the type in question are, for example, acrylates and methacrylates, preferably of monohydric to trihydric alcohols or alkoxylation products thereof, particularly ethoxylation products thereof. In the case of the alkoxylation products, an average of 0.8 to 12 mol alkylene oxide, such as ethylene oxide or propylene oxide, preferably ethylene oxide, has been added on for every hydroxyl group of the particular monohydric or polyhydric alcohol.

The acrylates of dihydric and trihydric alcohols and ethoxylation products thereof are particularly preferred as the reactive radiation-curing diluents.

The following diluents are mentioned by way of example: ethylene glycol di(meth)acrylate, di(meth)acrylates of diethylene glycol, triethylene glycol, tetraethylene glycol and pentaethylene glycol; propylene glycol di(meth)acrylate; di(meth)acrylates of di- to pentapropylene glycol; neopentyl di(meth)acrylate; butane-1,4-diol di(meth)acrylate; hexane-1,6-diol di(meth)acrylate; trimethylol propane tri(meth)acrylate, triacrylates of ethoxylated trimethylol propane having a degree of ethoxylation of 2.5 to 4 according to DE-PS 2 651 507. Reactive radiation-curing diluents are obtained in the range from 0 to 83% by weight, based on the total quantity of polymerizable constituents. The surface lacquer formulations according to the invention contain amine-modified polyether acrylate accelerators as key constituents. They are obtained by addition of secondary aliphatic amines onto reactive diluents containing at least two (meth)acryloyl groups per molecule. Suitable compounds are described in DE 23 46 424.

0.001 to 0.2% by weight, based on radiation-curing components, of typical polymerization inhibitors or antioxidants may be present as auxiliaries in the surface lacquer binder. Compounds such as these are, for example, 4,4'-bis-(2,6-ditert. butylphenol), 1,3,5-trimethyl-2,4,6-tris-(3,5-ditert. butyl-4-hydroxybenzyl)-benzene, 4,4'-butylidene-bis-(6-tert. butyl-n-cresol), 3,5-ditert. butyl-4-hydroxybenzyl phosphonic acid diethyl ester, N,N'-bis-($\beta$-naphthyl)-p-phenylenediamine, N,N'-bis-(1-methylheptyl)-p-phenylenediamine, phenyl-$\beta$-naphthyl amine, 4,4'-bis-($\alpha,\alpha$-dimethylbenzyl)-diphenyl amine, 1,3,5-tris-(3,5-ditert. butyl-4-hydroxyhydrocinnamoyl)-hexahydro-s-triazine, hydroquinone, p-benzoquinone, hydroquinone monomethyl ether, 2,5-ditert. butyl quinone, toluhydroquinone, p-tert. butyl pyrocatechol, 3-methyl pyrocatechol, 4-ethyl pyrocatechol, chloranil, naphthoquinone, copper naphthenate, copper octoate, Cu(I)Cl/triphenyl phosphite, Cu(I)Cl/trimethyl phosphite, Cu(I)Cl/trischloroethyl phosphite, Cu(I)Cl/tripropyl phosphite, p-nitrosodimethyl aniline.

In addition, the surface lacquer binder may contain as further auxiliaries antisedimenting agents, such as dimethyl stearyl amine, distearyl amine, stearic acid, metal stearates, monovalent to trivalent metals, stearyl alcohol, the corresponding oleyl derivatives, or surface-active agents, such as highly disperse silicas, and lubricants, such as silicones, in quantities of 0.1 to 5% by weight, based on radiation-curing components.

The antistatic layer is applied, for example, by the roller application systems typically used in the photographic industry.

The surface layers according to the invention are applied by technical coating systems, for example by printing processes, such as flexographic and gravure printing, or by roller application systems or by knife coating or casting. Their dry layer thickness is, in particular, from 0.5 to 25 g/m$^2$.

They are cured by ionizing radiation, optionally in an inert gas atmosphere, for example by electron beams. Although curing may be carried out with a radiation dose of about 0.1 to 200 kGy, it is preferred for economic reasons to use continuous coating machines of which the radiation sources have an acceleration voltage of 100 to 500 kilovolts (kV), corresponding to a radiation dose of 10 to 500 kGy. The distance of the electron beam source from the layer to be cured is typically 10 to 20 cm.

If the surface layers are cured by UV radiation, the surface layer binders must be provided in known manner with photoinitiators and, optionally, photosensitizers.

The photoinitiators or photosensitizers to be used are known per se and their choice is not the subject of the invention. Their use is largely confined to the appropriate application of UV radiation, although other forms of ionizing radiation may basically also be used. Useful photoinitiators and photosensitizers are, for example, benzophenone, acetophenone, benzoin and methyl, ethyl, isopropyl, butyl or isobutyl ethers of benzoin, $\alpha$-hydroxy and $\alpha$-aminoaryl ketones and benzil ketals. These substances are generally added in a concentration of 0.1 to 7.5% by weight, based on polymerizable components.

In one preferred embodiment, the radiation-curing surface lacquers according to the invention consist of (a) 25 to 95 parts by weight (meth) acryloyl-functional prepolymer, (b) 0 to 125 parts by weight reactive diluent, (c) 0 to 35 parts by weight amine-modified polyether acrylate, (d) 0 to 7.5% by weight UV initiator and (e) 0.1 to 5.0% by weight other additives, the percentages by weight being based on the sum of (a), (b) and (c).

EXAMPLES

Example 1

Preparation of Antistatic Coating Solution I

A mixture of 20 g polystyrene sulfonic acid ($M_n$ approx. 44,000), 3.6 g potassium peroxodisulfate, 5.6 g 3,4-ethylenedioxythiophene and water is stirred for 24 hours at room temperature. The 3,4-polyethylenedioxythiophene polystyrene sulfonate solution obtained is then ready for use.

Example 2

Preparation of Antistatic Coating Solution II

A mixture of 20 g polystyrene sulfonic acid ($M_n$ approx. 44,000), 8.1 g potassium peroxodisulfate, 5.6 g 3,4-ethylenedioxythiophene, 0.1 g iron(III) sulfate (iron content 22% by weight) and 1 l water is stirred for 24 hours at room temperature. The 3,4-polyethylenedioxythiophene polystyrene sulfonate solution obtained is then ready for use.

Example 3

Preparation of Antistatic Coating Solution III

A mixture of 6.7 g polystyrene sulfonic acid ($M_n$ approx. 38,000), 14.4 g potassium peroxodisulfate, 33.6 g 3,4-ethylenedioxythiophene, 0.45 g sulfosuccinic acid diisooctyl ester Na salt and 1 l water is stirred for 24 hours at room temperature. The 3,4-polyethylenedioxythiophene polystyrene sulfonate solution obtained is then ready for use.

Example 4

Preparation of Antistatic Coating Solution IV

A mixture of 20 g polystyrene sulfonic acid ($M_n$ approx. 44,000), 3.6 g potassium peroxodisulfate, 5.6 g 3,4-ethylenedioxythiophene and 1,000 ml water is stirred for 24 hours at room temperature. The 3,4-polyethylenedioxythiophene polystyrene sulfonate solution obtained is then ready for use.

Before coating of the film supports, the solutions of Examples 1 to 4 are diluted with water to a solids content of 0.3% by weight.

Examples 5 to 8

Preparation of the Antistatic Film Supports

The water-diluted antistatic coating solutions of Examples 1 to 4 are applied by a roller application system to 100 μm thick polyethylene terephthalate film supports coated with an adhesion layer based on vinylidene chloride/methyl methacrylate/itaconic acid copolymer and the coating is subsequently dried. The coated films have the following properties:

TABLE 1

| Film support Ex. | Coating solution of Ex. | Quantity of coating, dry mg/m$^2$ | Discharge time msec. at 30% rel. humidity |
|---|---|---|---|
| 5 | 3 | 61 | <0.006 |
| 6 | 4 | 52 | <0.006 |
| 7 | 1 | 50 | <0.006 |
| 8 | 2 | 200 | <0.006 |

The coating compositions used for the production of the surface layers had the following compositions:

Example 9

100 parts by weight amine-modified polyether acrylate
15 parts by weight hexane-1,6-diol diacrylate
6.5 parts by weight trimethyl benzophenone, isomer mixture

Example 10

60 parts by weight epoxyacrylate resin according to DE-OS 24 29 527, Example 3 (compound 1)
35 parts by weight propoxylated trimethylol propane triacrylate (compound 2)
24 parts by weight diethylamine-modified, propoxylated trimethylol propane triacrylate (compound 3)
60 parts by-weight hexane-1,6-diol diacrylate
10 parts by weight benzophenone

Example 11

60 parts by weight aliphatic urethane acrylate according to DE-OS 27 37 406, Example 1
32 parts by weight compound 2
48 parts by weight compound 3
84 parts by weight hexane-1,6-diol diacrylate
12 parts by weight benzophenone

Example 12

75 parts by weight aliphatic urethane acrylate according to Example 11
50 parts by weight polyether acrylate
15 parts by weight compound 3
100 parts by weight hexane-1,6-diol diacrylate
10 parts by weight benzophenone
5 parts by weight 1-hydroxycyclohexyl phenyl ketone
3 parts by weight low-viscosity polydimethyl siloxane

Example 13

60 parts by weight compound 1
35 parts by weight compound 2
24 parts by weight compound 3
60 parts by weight hexane-1,6-diol diacrylate
12.5 parts by weight trimethyl benzophenone, isomer mixture
0.3 part by weight low-viscosity polydimethyl siloxane

Example 14

81.5 parts by weight epoxyacrylate according to Example 10
29 parts by weight compound 3
58.5 parts by weight hexane-1,6-diol diacrylate
12.5 parts by weight trimethyl benzophenone, isomer mixture
5 parts by weight low-viscosity polydimethyl siloxane

Example 15

100 parts by weight amine-modified polyether acrylate
15 parts by weight hexane-1,6-diol diacrylate
6.5 parts by weight trimethyl benzophenone, isomer mixture
5 parts by weight low-viscosity polydimethyl siloxane The surface layer coating compositions were applied by a hand coater to the antistatically treated film supports and subsequently cured by UV radiation or by electron beams (EBC). The properties of the film back layers are set out in Table 2 as Examples 19 to 29.

The values shown were determined as follows:

Scratch resistance:
  was evaluated after rubbing with a hard object.

Adhesion strength dry:
  A crosshatch adhesion test was carried out in accordance with DIN 53 151 by making two groups of 6 cuts each at 1 mm intervals perpendicularly to one another so that they intersected. The results are evaluated on a graduated scale of 0 to 5 in which 0 stands for a lacquer otherwise undamaged after cutting while, at 5, more than 65% of the total of 25 squares formed actually flake off during cutting.

Adhesion strength wet:
  The films were placed in water for 10 minutes at 38° C. and then wiped dry under light pressure. The results are evaluated on a qualitative scale of 0 (undamaged) to 5 (completely detached).

TABLE 2

| Ex. | Antistatic layer (film support) | Surface layer (lacquer formulation) | Thickness [μm] | Scratch resistance | Adhesion dry | Adhesion wet | Curing conditions |
|---|---|---|---|---|---|---|---|
| 19 | 5 | 9 | 4 | Undamaged | 0 | 1 | UV[2] |
| 20 | 5 | 10 | 4 | " | 0 | 0 | UV |
| 21 | 6 | 10 | 4 | " | 0 | 0 | UV |
| 22 | 7 | 10 | 4 | " | 0 | 0 | UV |
| 23 | 5 | 11 | 4 | " | 0–1 | 0 | UV |
| 24 | 6 | 12 | 4 | " | 0 | 0 | UV |
| 25 | 7 | 12 | 4 | " | 0 | 0 | UV |
| 26 | 7 | 13 | 4 | " | 0–1 | 0 | UV |
| 27 | 7 | 14 | 4 | " | 0–1 | 0 | UV |
| 28 | 7 | 15 | 4 | " | 0 | 0 | UV |
| 29 | 7 | 10 | 4 | " | 0 | 3 | EBC[1] |

[1]Radiation intensity: 50 KGy under N$_2$
[2]IST lamp type U 300-M-1-TR, tube type MC 200, UV = 180 to 450 nm

Determination of Discharge Time

For selected Examples, the capacitive resistance (RC) corresponding to the discharge time (in msec.), which is a measure of the mobility of the electrical charges, was determined at 30% relative air humidity/21° C. before and after a wet development process.

By wet development is meant a typical development and fixing treatment followed by washing baths and drying steps such as are typically applied in the processing of photographic silver halide emulsion materials.

The results are set out in Table 3:

TABLE 3

| | RC value in msec. | |
|---|---|---|
| Example | Before wet development | After wet development |
| 7 | <0.006 | 0.023 |
| 26 | 0.032 | 0.025 |

TABLE 4

| Example | Antistatic layer (film support) | Surface layer | Scratch resistance | RC value in msec. before wet development | RC value in msec. after development | Adhesion dry | Adhesion wet | Curing conditions |
|---|---|---|---|---|---|---|---|---|
| 34 | 30 | — | Average | <0.006 | >3200 | 0 | 4 | — |
| 35 | 30 | 9 | Undamaged | 0.053 | 0.033 | 0 | 0 | UV |
| 36 | 30 | 10 | " | 0.067 | 0.048 | 0 | 0 | UV |
| 37 | 30 | 11 | " | 0.020 | 0.023 | 0 | 0 | UV |

| Example | RC value in msec. Before wet development | RC value in msec. After wet development |
|---|---|---|
| 28 | <0.006 | <0.006 |
| 22 | 0.022 | 0.050 |
| 27 | 0.016 | 0.015 |
| 29 | 0.01 | 0.013 |
| 19 | <0.006 | 0.10 |
| 20 | <0.006 | <0.006 |
| 23 | 0.057 | 0.12 |

The results in Table 3 prove that the charge mobility in the antistatic/surface layer arrangements mentioned above is substantially unchanged before and after wet development corresponding to Comparison Example 7, in which there is no protective surface layer, the materials thus coated having a so-called permanently antistatic character.

The adhesion behavior of the surface layers with respect to photographic silver halide emulsion layers was tested as follows: First each sample including Comparison Example 7 is conditioned for 24 hours at 21° C. in an atmosphere of 60% relative air humidity, after which the samples are contacted with the silver halide emulsion layers for 3 days at 57° C.

When the directly contacted materials were separated, the emulsion layer did not adhere to any of the samples (Examples 22, 26, 19, 20, 23, 27, 28, 29) while the coating of sample 7, which was not provided with a surface layer, separated from the plastic support and was transferred to the emulsion layer.

Example 30

20 g NH$_4$VO$_3$ and 300 g of a cationic ion exchanger are introduced into 1000 g water and stirred for 10 minutes at room temperature. 1500 g water are then added with intensive stirring. The ion exchanger is then separated off by filtration. A colloidal solution (sol) of V$_2$O$_5$ is obtained.

The colloidal solution described above—after 142 ml have been diluted with 858 ml water—is applied to a 100 μm thick polyethylene terephthalate film support coated with an adhesion layer based on vinylidene chloride/methyl methacrylate/itaconic acid copolymer. The coating of colloidal solution is applied in a wet film thickness of 100 m²/l. The coating is dried at 120° C. A transparent and substantially colorless antistatic layer was obtained.

Examples 31 to 33

Pieces of the film produced in accordance with Example 30 were coated with various surface layer lacquer formulations (Examples 9 to 11) in a dry layer thickness of 4 μm.

Scratch resistance, charge mobility and adhesion (wet and dry) were determined. Table 4 below shows that the surface layer according to the invention is necessary for wet adhesion and for retention of the charge mobility of the antistatic layer after processing.

We claim:
1. An antistatic element comprising:
   a plastic support having a surface;
   a first layer on the surface of said plastic support, said first layer being polythiophene made up of units of the formula

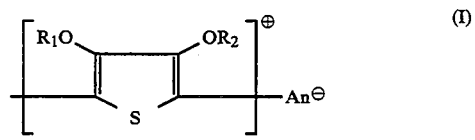

in which
   R$_1$ and R$_2$ independently of one another represent hydrogen or a C$_{1-4}$ alkyl group or, together form an optionally substituted C$_{1-4}$ alkylene radical, preferably an optionally alkyl-substituted methylene radical, an optionally C$_{1-12}$ alkyl- or phenyl-substituted 1,2-ethylene radical, a 1,3-propylene radical or a 1,2-cyclohexylene radical and
   An$^{(-)}$ is a polyanion; and
   a second layer, said second layer being a prepolymer which is curable by exposure to ionizing radiation.
2. A composition as claimed in claim 1, wherein the ionizing radiation-curable prepolymer is a prepolymer containing (meth)acryloyl groups.
3. A composition as claimed in claim 2, wherein the prepolymer contains 2 to 4 (meth)acryloyl groups per molecule.
4. A composition as claimed in claim 2, wherein the prepolymer is a urethane acrylate, an epoxyacrylate, a polyester acrylate, an amine-modified polyester acrylate, a polyether acrylate or an aromatic polyether urethane.
5. A composition as claimed in claim 1, wherein the prepolymer consists of
   (a) 25 to 95 parts by weight (meth)acryloyl-functional prepolymer,
   (b) 0 to 125 parts by weight reactive diluent,
   (c) 0 to 35 parts by weight amine-modified polyether acrylate,
   (d) 0 to 7.5% by weight UV initiator and
   (e) 0.1 to 5.0% by weight other additives, the percentages by weight being based on the sum of (a), (b) and (c).
6. A composition as claimed in claim 1, wherein the plastic moldings are support materials for photographic elements.
7. An antistatic layered element comprising:
   a plastic coated support;
   a first layer of polythiophene made up of units of the formula

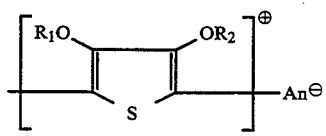

(I)

in which $R_1$ and $R_2$ independently of one another represent hydrogen or a $C_{1-4}$ alkyl group or, together form an optionally substituted $C_{1-4}$ alkylene radical, preferably an optionally alkyl-substituted methylene radical, an optionally $C_{1-12}$ alkyl-or phenyl-substituted 1,2-ethylene radical, a 1,3-propylene radical or a 1,2-cyclohexylene radical, $An^{(-)}$ is a polyanion; and a second layer, which layer is a prepolymer curable by exposure to ionizing radiation.

* * * * *